United States Patent [19]
Burton
[11] 3,895,317
[45] July 15, 1975

[54] CONTROL CIRCUITS

[75] Inventor: Gardner Thomas Burton, Runnemede, N.J.
[73] Assignee: RCA Corporation, New York, N.Y.

[22] Filed: Apr. 6, 1973
[21] Appl. No.: 348,722

Related U.S. Application Data

[60] Division of Ser. No. 138,768, April 29, 1971, Pat. No. 3,787,887, which is a continuation of Ser. No. 769,292, Oct. 21, 1968, abandoned.

[52] U.S. Cl. .................. 332/7.51; 315/18; 350/147
[51] Int. Cl. .................. H01s 3/10
[58] Field of Search .................. 332/7.51; 331/94.5; 250/199, 205; 178/6.7 R, 6.7 A; 315/18; 350/147, 150

[56] References Cited
UNITED STATES PATENTS
3,562,422 2/1971 McMann .................. 178/6.7

*Primary Examiner*—Richard A. Farley
*Assistant Examiner*—N. Moskowitz
*Attorney, Agent, or Firm*—Edward J. Norton; Joseph D. Lazar

[57] ABSTRACT

Disclosed is a control circuit for establishing a reference level at the output of an optical modulator used to modulate the intensity of a laser beam. The modulated beam is sampled in the presence of a predetermined signal applied to the modulator to detect deviation from a known relationship; and means provided to correct for such deviation and re-establish said known relationship.

3 Claims, 2 Drawing Figures

CONTROL CIRCUITS

Figure 1:
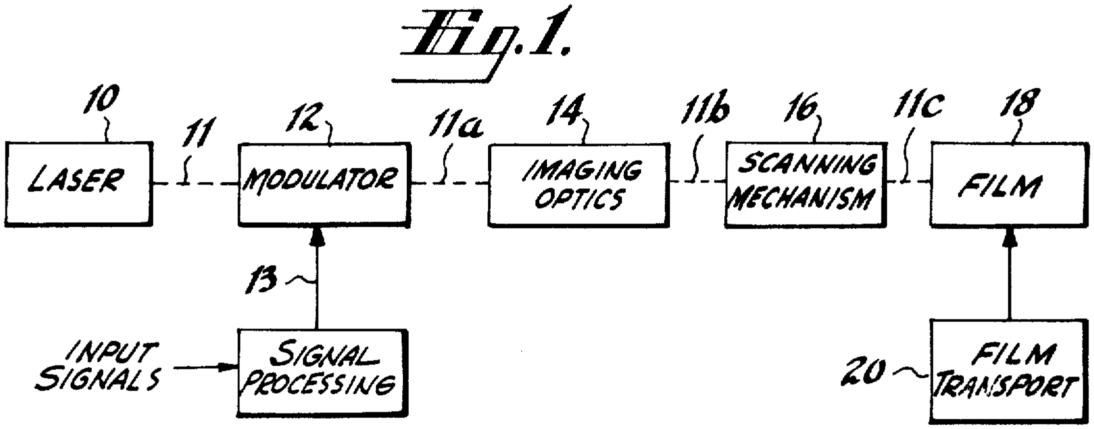

This is a division of my copending application, Ser. No. 138,768, filed Apr. 29, 1971, and now U.S. Pat. No. 3,787,887, which, in turn, is a streamlined continuation of my application Ser. No. 769,292, filed Oct. 21, 1968, and now abandoned.

This invention relates to control circuits; and, more particularly, to a control circuit for use within a laser recorder which provides the establishment of a reference level at the output of an optical modulator used to modulate the intensity of a laser beam.

In laser recording, input video signals intensity modulate a laser beam, which is then scanned in a two dimensional pattern on silver-halide film, resulting in a permanent record after photographic development. Laser recorders are generally of two types: signal recorders which record signals on film for playback; and image recorders which record on film for separate visual use without playback. While the invention will be described in conjunction with a laser beam image recorder, additional applications will become evident in light of the present disclosure. For example, the foregoing technique can also be used to stabilize a recorder playback system where it is required to record information about an optical bias located at some intermediate point between the black and white reference levels.

Recently, developments advancing the state of the art in image sensor technology have resulted in the achievement of image resolution exceeding the capabilities of conventional image recorders. Image sensors having a total resolving power of 5,000 elements per picture width are now in use, and additional growth is expected. An image recorder capable of reproducing images from such a sensor at high information rates and with minimal degradation have been implemented using laser recording techniques. Typical image sensors which might be used include high-resolution TV camera tubes; infrared and other scanned detectors; side-looking radars; and laser ground scanners. All of these sensors have been developed to the point where they can achieve resolutions of 5,000 elements per scan or more. Bandwidths of some of these sensors exceed 100 Megahertz.

A laser beam image recorder uses coherent optical techniques to produce a modulated, rapidly scanning, recording spot of light. The recording spot produces a permanent record of processed input signals generally on silver-halide film. The major functions which must be implemented in the operation of an image recorder are: the establishment of a basic recording energy source; the modulation of this energy source by the signals to be recorded; focusing the modulated energy source into a high energy density recording spot; and scanning the recording medium with the recording spot.

The laser is used as energy source because it possesses a coherent radiation characteristic compatible with wideband intensity modulator requirements. Furthermore, its energy is amenable to being collected and formed into a recording spot with diffraction limited performance at high efficiency. Wideband intensity modulation is accomplished by electro-optic techniques, i.e., electro-optic crystals are used to intensity modulate the external laser source by application of a signal voltage.

Where it is desired to directly record pictorial information on film, as in the case of an image recorder, it is essential that a reference level be established so that the relative contrast of the recorder image be an accurate representation of the scene being recorded; i.e., the black portions of the scene be recorded as black; the white portions as white; and the intermediate shades as corresponding half-tones. In the absence of such a reference level the modulator and/or its drive amplifier will drift resulting in a distorted representation of the recorded image.

Accordingly, it is an object of the present invention to provide a control circuit for establishing a reference level at the output of an optical modulator used to modulate the intensity of a laser beam.

In accordance with the present invention, a control circuit for establishing a reference level at the output of an optical modulator used to modulate the intensity of a laser beam comprises: means for sampling a portion of the laser beam appearing as an output of the modulator; optical means for resolving said sampled portion into first and second components, said components bearing a known relationship to each other in the presence of a predetermined signal applied to said modulator; means for transforming said components to electrical signals having a like relationship; circuit means for monitoring the relationship between said signals and detecting change from said known relationship; and feedback means, operable in the presence of said predetermined signal, to adjust the operation of said modulator and re-establish said known relationship.

Figure 2:
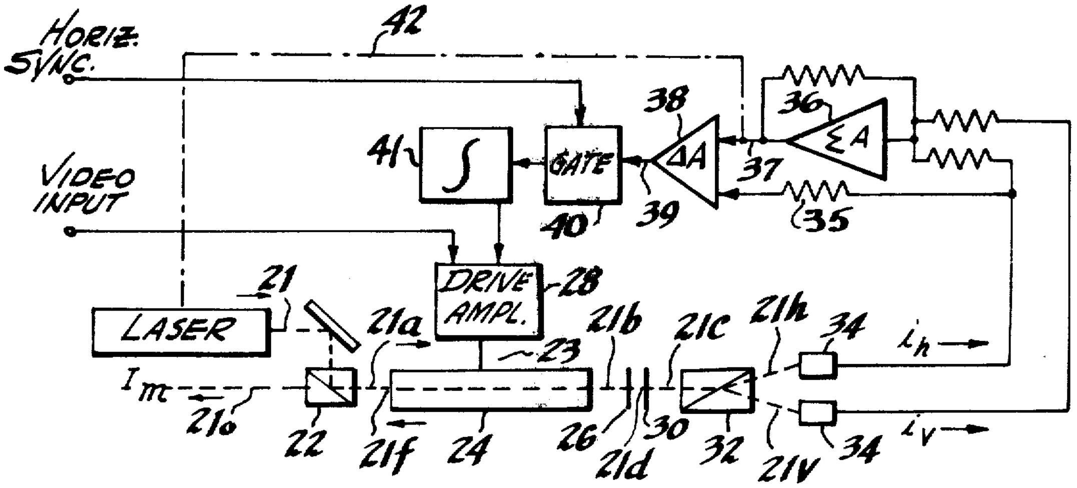

The present invention, as well as additional objects and advantages thereof, will be best understood upon reading the following description in conjunction with the accompanying drawing wherein:

FIG. 1 is a block diagram representative of signal flow between the components comprising a laser beam image recorder; and FIG. 2 is representative of a reference level control circuit in accordance with the present invention.

Turning now to a brief description of FIG. 1, the light modulator 12 accepts the laser beam 11 emitted by the laser 10 and modulates its intensity in response to the input signal 13. The modulator 12 may be of the type which uses electro-optic crystals to rotate the polarization of the linearly polarized laser beam 11 as a direct function of the applied signal voltage 13. Polarization modulation is converted into intensity modulation by a polarization analyzer attached to the modulator 12.

The beam-enlargement and spot-forming optics, i.e., imaging optics 14, increases the diameter of the intensity modulated laser beam 11*a* until it fills the desired aperature of the imaging lens. The convergent cone of light 11*b* leaving the imaging lens is intercepted by a scanning mirror incorporated within the scanning mechanism 16. Scanning is accomplished by rotating a multifaced mirror in precision air bearings with a direct-drive servo motor. Thus, the converging cone of light 11*c*, directed by the scanning mechanism 16, repetitively swings through an arc and produces an active scan on the film 18, which is curved to conform to the focal path. The film 18 is held to a curved film transport table 20, also supported by air bearings, which is coupled to a precision ball screw directly driven by a d-c servo motor to provide for smooth and precise film transport. Servo control systems are employed to synchronize scanning and film transport to image sensor signals. Video signal processing to provide gamma correction and for light modulator drive is also employed.

FIG. 2 is a block diagram of a system which, when used in conjunction with an optical modulator operating in the reflex mode, allows the establishment of a reference level at the output of a laser and further permits the control of the laser intensity. As has previously been mentioned, the establishment of a reference level is essential when it is desired to directly record pictorial information on film. As a practical matter a black reference level is most desirable for reasons to be described infra, and further discussion of the present invention will relate thereto.

In the embodiment of the present invention represented by FIG. 2, a laser beam 21, polarized perpendicular to the plane of the drawing, is impressed at the input of a Glan-Foucault prism 22. The beam 21*a* is then deflected into a modulator 24 such as the Beckman Whitley Model 10 unit which is one type of polarization modulator utilizing electro-optic crystals to rotate the polarization of a light beam in response to an electrical signal applied thereto. Thereafter the beam 21*b* strikes a partially reflecting mirror 26, e.g., approximately 90% reflecting, and a major portion 21*f* is reflected back, over the same path, through modulator 24 exiting through the prism 22. If the polarization characteristics of the beam are unchanged, i.e., it remains lineraly polarized in the same direction, the reflected portion of the beam 21*f* is entirely deflected back toward the laser via the Glan-Foucault prism 22 and no output signal $I_m$ is transmitted. This corresponds to a peak black level, i.e., a reference level of zero intensity at the output of the prism 22 with no applied signal to the modulator 24. However, if a voltage signal 23 is coupled to the modulator 24 via a drive amplifier 28, a component polarized orthagonally to the input is introduced which is then passed directly through the prism 22 appearing as an output component 21*o* having an intensity designated $I_m$. This output component 21*o* is then passed onto the imaging optics portion of the recorder 14 shown in FIG. 1, i.e., the beam-enlargement and spot-forming optics. When an appropriate signal is applied to the modulator 24 to result in a quarter-wave phase shift of the polarized beam 21*a*, the complete beam 21*a* is transformed into a vertically polarized component resulting in the maximum transfer of optical power 21*o* at the output of the prism 22. This condition corresponds to the peak white level.

At the same time that optical energy is exiting from the prism 22, as a function of the signal 23 applied to the modulator 24, a portion 21*d* of the energy 21*b* passed through the modulator 24 is transmitted through the partially reflecting mirror 26. This energy 21*d* can be used to effectively control the bias voltage applied to the modulator to establish a black level reference, and may also be used to control the intensity of the laser.

The energy 21*d* transmitted through the partially reflecting mirror has a polarization characteristic which is similar to the characteristic of the component 21*o* observed at the output of the prism. If a quarter-wave plate 30 and a Wollaston prism 32 are inserted in the path of the transmitted beam 21*d*, the beam is split into horizontally 21*h* and vertically 21*v* polarized components which vary as a function of the applied voltage signal 23. For the condition of no applied signal, i.e., the transmission of a black level, the quarter-wave plate 30 transforms the linearly polarized wave 21*b* to a circularly polarized wave 21*c*. The Wollaston prism accepts the circularly polarized wave 21*c* and splits it into vertically 21*v* and horizontally 21*h* polarized components of equal intensity. As a voltage signal 23 is applied to the modulator 24 the intensity of the vertical 21*v* and horizontal 21*h* components will vary individually but their net sum will always be a constant value.

The two polarization components 21*v*, 21*h* are thereafter picked up by photodiodes 34 and transformed into two control signals $i_v$, $i_h$. These signals are summed in an operational amplifier 36 which produces an output 37 that is directly related to the average intensity of the laser beam 21. The output 37 of the amplifier 36 is thereafter fed to one side of a differential amplifier 38. The other side of the differential amplifier 38 is driven via a summing resistor 35 by either the horizontal 21*h* (as represented by $i_h$) or vertical 21*v* (as represented by $i_v$) polarization component developed at the output of the Wollaston prism 32. When the black level is being transmitted, the value of the horizontally 21*h* (or vertically 21*v*) polarized component should equal the generated average value 37. If during the period of black level transmission this should not be the case, an error signal 39 is developed which is equal to the difference between the two signals. To provide an error indication, however, the transmitted signal 39 must be sampled when the reference level is present. Consequently, in a video system the output of the amplifier is sampled during the black period by the gate 40 and integrated over several samples, via the integrating circuit 41, to develop a true error signal. In raster scanning the sampling operation is initiated by the horizontal sync pulse which corresponds to a black level.

The error signal 39 is then fed back to a clamping circuit in the modulator drive amplifier. The clamping level is varied to servo the black level signal applied to the modulator to produce a true black level at the output. This will hold the black level despite drifts in the drive amplifier 28 and modulator 24. It will also maintain the black level in the presence of intensity variations of the laser beam. By providing a feedback loop 42 to the power supply (not shown) of the laser, the average value indication can be used to control the intensity of the laser in addition to providing a black level control.

What is claimed is:

1. A control circuit for establishing a reference level at the output of an optical modulator used to modulate the intensity of a linearly polarized laser beam comprising:

a. a partially reflecting mirror disposed to transmit a portion of the linearly polarized laser beam appearing at the output of said modulator;

b. a quarter wave plate disposed in the path of the transmitted portion, said plate serving to transform the transmitted portion of said linearly polarized beam into an elliptically or circularly polarized beam;

c. a Wollaston prism disposed in the path of said elliptically or circularly polarizing beam, said prism serving to split said beam into first and second components, said components bearing a known relationship to each other in the presence of a predetermined signal applied to said modulator;

d. first and second photodiodes disposed in the path of said first and second components, said photodiodes serving to transform said components into first and second electrical signals;

e. first circuit means, including an operational amplifier and a differential amplifier, for monitoring the relationship between said electrical signals to detect a change from said known relationship and produce an error signal in response to said change; and f. second circuit means for applying said error signal to said modulator in the presence of said predetermined signal in a manner causing the transmitted portion of said laser beam to re-establish said known relationship at the output of said prism.

2. A control circuit as defined in claim 1 wherein the net intensity of said first and second components is maintained at a known constant value in the presence of a laser having an output of constant intensity, further comprising, means for monitoring the net intensity of said first and second components to detect a deviation from said known constant value and feeding back a signal indicative of said deviation to adjust the operation of said laser and re-establish said known constant intensity value.

3. A control circuit for maintaining a black level reference at the output of an optical modulator used to modulate the intensity of a linearly polarized laser beam in response to the application of a video input, comprising:

a. a partially reflecting mirror disposed at the output of the modulator to transmit a portion of the beam;

b. a quarter-wave plate disposed in the path of said transmitted portion, said plate serving to transform said transmitted portion into a circularly polarized beam in the presence of the horizontal synchronizing pulse portion of the video input;

c. a Woolaston prism disposed in the path of said circularly polarized beam, said prism serving to split said circularly polarized beam into first and second components of equal intensity;

d. first and second photodiodes disposed in the path of said first and second components, said photodiodes serving to transform said components into first and second electrical signals;

e. first circuit means for monitoring the relationship between said signals to detect any change therein and produce an error signal in response to said change;

f. second circuit means adapted to pass said error signal during said synchronizing pulse portion of said video input, g. further means for applying the output of said second circuit means to said modulator in the presence of said video input in a manner causing the synchronizing pulse portion of said video input to produce first and second components of equal intensity at the output of said prism.

* * * * *